United States Patent
Dine et al.

(10) Patent No.: US 7,134,964 B2
(45) Date of Patent: *Nov. 14, 2006

(54) PROPELLER SHAFT ASSEMBLY WITH STIFFENING FEATURE

(75) Inventors: Donald W. Dine, Rochester Hills, MI (US); Craig A. Campbell, West Bloomfield, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/644,441

(22) Filed: Aug. 20, 2003

(65) Prior Publication Data

US 2005/0043104 A1    Feb. 24, 2005

(51) Int. Cl.
*F16C 3/00* (2006.01)
(52) U.S. Cl. .................... 464/180; 29/525; 464/181
(58) Field of Classification Search ............... 464/127, 464/180, 181, 183; 138/149; 181/207, 208; 285/55, 398; 29/525, DIG. 25
See application file for complete search history.

(56) References Cited

U.S. PATENT DOCUMENTS

| | | | | |
|---|---|---|---|---|
| 151,166 | A * | 5/1874 | Shaw | ........................... 285/55 |
| 373,339 | A * | 11/1887 | Clifford | ....................... 464/183 |
| 2,370,193 | A * | 2/1945 | Reid | ........................... 285/55 |
| 2,724,672 | A * | 11/1955 | Rubin | ........................ 285/55 X |
| 3,286,487 | A * | 11/1966 | Esperson | ..................... 464/180 |
| 4,272,971 | A | 6/1981 | Loyd et al. | |
| 4,484,770 | A * | 11/1984 | Sloane | .......................... 285/55 |
| 4,560,012 | A * | 12/1985 | McNeely, Jr. | |
| 5,260,522 | A | 11/1993 | Vogt et al. | |
| 5,397,272 | A * | 3/1995 | Smiley et al. | .............. 464/181 |
| 5,924,531 | A | 7/1999 | Stark et al. | |
| 6,156,682 | A * | 12/2000 | Fletemier et al. | |
| 6,234,911 | B1 | 5/2001 | Breese et al. | |
| 6,254,488 | B1 * | 7/2001 | Hill | ............................... 464/180 |
| 6,287,209 | B1 | 9/2001 | Nakajima et al. | |
| 6,530,137 | B1 * | 3/2003 | Dewimille et al. | ..... 138/149 X |
| 6,752,722 | B1 * | 6/2004 | Armitage et al. | ........... 464/180 |
| 2002/0128080 | A1 | 9/2002 | Russell | |

FOREIGN PATENT DOCUMENTS

EP    0 471 240 A2 *    2/1992    .................. 464/181

* cited by examiner

*Primary Examiner*—Greg Binda
(74) *Attorney, Agent, or Firm*—Jennifer M. Brumbaugh; Mick A. Nylander

(57) ABSTRACT

A propeller shaft assembly includes a thin-walled tubular member, a connecting member fixed to each end of the tubular member, and a support member fixed within the tubular member. The support member includes a foamed plastic impregnated with a high modulus resin or cement extending a first length (L1) within the tubular member and engaging an interior surface of the tubular member to increase the bending frequency of the propeller shaft assembly.

20 Claims, 2 Drawing Sheets

PROPELLER SHAFT ASSEMBLY WITH STIFFENING FEATURE

TECHNICAL FIELD

The present invention relates to propeller shaft assemblies for motor vehicles. In particular, the invention concerns a driveline propeller shaft assembly with a stiffening feature.

BACKGROUND OF THE INVENTION

Vehicle drivelines typically include constant velocity joints, side shafts and propeller shafts in various configurations to provide motive power for the vehicle. Constant velocity fixed joints are known in various designs. Such joints are used primarily in the driveline of a motor vehicle for driving the wheels of a motor vehicle. They can be used in either propeller shafts or in side shafts. Side shafts extend from the axle drive to the driven wheels; for example, they connect the output ends of the rear axle differential with the driven wheel hubs of the wheels. Propeller shafts serve to transmit the drive from the gearbox output of the front wheel drive unit to the rear axle differential associated with the rear axle.

As far as propeller shafts are concerned, a number of different designs are used. They may comprise, for example, a shaft with two joints which are arranged at the ends of the shaft which serve to be connected to the gearbox output in front, and to the drive input at the rear. Multi-section propeller shafts are also common. For example, two propeller shaft portions can be connected by a center bearing or intermediate bearing. Normally, at the ends of the propeller shafts, i.e., towards the gearbox output and the drive input, there are arranged universal joints. It is also possible for a universal joint to be provided in the central region. A constant velocity plunging joint can also be provided in the central region. The propeller shafts themselves typically are made of metal, although carbon fiber and other materials have also been used.

The drive unit of the motor vehicle generates vibrations which, in prior art assemblies, are transmitted to the propeller shaft in the form of movement vibrations and structure-borne sound. Moreover, vibrations are induced from the relatively high rotational speeds of the propeller shafts themselves. In addition, changing torque values and rotational speeds constantly occur during the transmission of the rotational movement throughout the driveline assembly. Load values suddenly increasing to 10 times the nominal torque, and rotational speeds up to 10,000 revolutions per minute are not rare.

To reduce the transmission of vibration and structure-borne sound to the vehicle compartment, multi-sectional propeller shafts are typically used with an intermediate or center bearing located at a nodal point along the propeller shaft assembly. Dynamic dampers are also used along an intermediate portion of multi-sectional propeller shafts to minimize vibrations. In some cases, it would be preferable for packaging concerns, or cost/weight concerns to employ a smaller diameter propeller shaft. There also exists a need for a more rigid propeller shaft to permit longer shafts without the need for an intermediate bearing or dynamic damper.

SUMMARY OF THE INVENTION

The present invention provides a propeller shaft having improved structural rigidity. The propeller shaft assembly includes a thin-walled tubular member, a connecting member fixed to each end of the tubular member, and a support member fixed within the tubular member. The support member includes a rigid foamed plastic extending a first length (L1) within the tubular member and engaging an interior surface of the tubular member to increase the bending frequency of the propeller shaft assembly. The rigid foamed plastic can be a flexible open-cell plastic foam impregnated with a high modulus resin or cement. The support member can be tubular, as well, or cylindrical. The support member can also include radial openings formed along the length thereof to additionally decrease the weight of the support member.

In another embodiment, a power transmission shaft is provided. The shaft includes a thin-walled metal or reinforced plastic tube having a joint element or stub shaft fixed to each end thereof, and a support member co-axially located within the tube and engaging an interior surface of the tube. The support member includes a rigid foamed plastic extending along the length of the tubular member and engaging an interior surface of the tubular member to increase the bending frequency of the power transmission shaft. The rigid foamed plastic can be an open-cell plastic foam impregnated with a high modulus resin or cement. The support member can be tubular, as well, or cylindrical. The support member can also include radial openings formed along the length thereof to additionally decrease the weight of the support member.

In another example, a power transmission shaft comprising a thin-walled metal or reinforced plastic tube having a joint element or stub shaft fixed to each end thereof, and a support member co-axially located within the tube and engaging an interior surface of the tube is provided.

In another embodiment, a method of producing a rigid power transmission shaft is provided. The method includes providing a thin-walled metal or reinforced plastic tube, and introducing a support member co-axially within the tube to engage an interior surface of the tube. The support member includes a rigid foamed plastic extending along a length of the tubular member. The rigid foamed plastic can be a flexible open-cell plastic foam impregnated with a high modulus resin or cement.

The present invention is advantageous in that the propeller shaft can be made longer while at the same time reducing or eliminating bending vibrations within the vehicle driveline. Because of the improved rigidity, smaller diameter shafts can potentially be used in the driveline as well.

Other advantages of the invention will become apparent to one of skill in the art upon reading the following detailed description and with reference to the drawings illustrating features of the invention by way of example.

BRIEF DESCRIPTION OF THE DRAWINGS

For a more complete understanding of this invention, reference should now be made to the embodiments illustrated in greater detail in the accompanying drawings and described below by way of examples of the invention.

In the drawings.

DETAILED DESCRIPTION OF THE INVENTION

In the following description, various operating parameters and components are described for one constructed embodiment. These specific parameters and components are included as examples and are not meant to be limiting.

Figure 1:
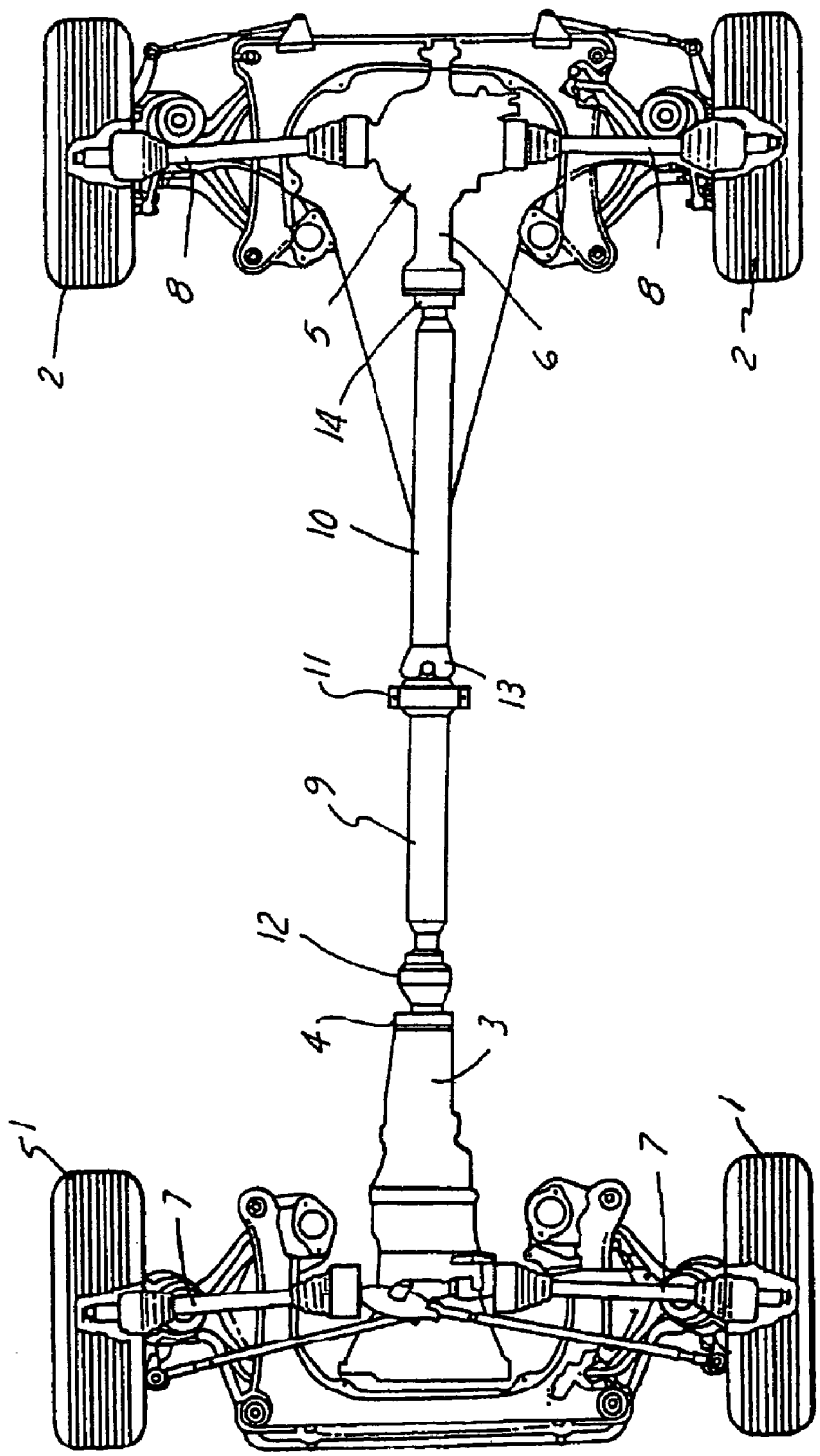
FIG. 1 is a diagrammatic illustration of a vehicle driveline having a propeller shaft assembly in which the present invention may be used to advantage.

While the invention is described with respect to a propeller shaft having improved rigidity within the driveline of a vehicle, the following apparatus is capable of being adapted to various purposes including automotive vehicles, motor systems that use a propeller shaft, or other vehicle and non-vehicle applications which require a rigid torque-transmitting shaft. Referring now to the drawings wherein like reference numerals are used to identify identical components of the various views, FIG. 1 illustrates a diagrammatic view of an exemplary driveline of a motor vehicle having a propeller shaft assembly in which the present invention may be used to advantage. The driveline assembly of FIG. 1 is illustrative of the environment in which a propeller shaft in accordance with the present invention may be used. Other driveline layouts may also be improved by use of the propeller shaft disclosed herein, including single unit propeller shaft arrangements or multi-section propeller shaft arrangements for rear wheel drive or four-wheel drive vehicles. The shaft in accordance with the present invention may also be used in side shaft assemblies, or in non-automotive torque shaft applications.

In the example of FIG. 1, there is shown a driveline for a four-wheel drive vehicle. The two front wheels 1 and the two rear wheels 2 are driven. FIG. 1 also shows the gear box 3 with the gear box output 4. In the region of the rear axle, there is provided the axle drive 5 with the drive input 6. The two front wheels 1 are driven by side shafts 7. The two rear wheels 2 are driven by the side shafts 8, starting from the axle drive 5. The connection between the gear box 3 and the axle drive 5 is provided by a propeller shaft assembly which comprises two propeller shaft portions 9 and 10. The propeller shaft assembly is additionally supported on the floor assembly of the vehicle by an intermediate bearing 11 which, in this example, is arranged approximately centrally. The intermediate or center bearing 11 can be a center bearing tuned absorber, i.e., a dynamic damper.

In the first propeller shaft portion 9, the propeller shaft assembly includes a first rotary joint 12 arranged near the gear box output 4. For connecting the two propeller shaft portions 9, 10, there is provided a second rotary joint 13. At the end of the second propeller shaft portion 10, there is arranged a third rotary joint 14 which, via a connecting mechanism, is connected to the drive input 6 of the axle drive 5 in the region of the rear axle. In many applications, the propeller shaft portions 9, 10 can rotate at a speed which is higher than the speed introduced by the engine. The reduction of the speed for the rear wheels 2 takes place in the axle drive 5. Whereas, for example, the propeller shaft assembly with the propeller shaft portions 9, 10 and the associated the joints 12, 13, 14 may rotate at speeds of up to 10,000 revolutions per minute. The speeds of the side shafts 8 for driving the rear wheels 2 reach only approximately up to 2,500 revolutions per minute.

Thus, the driveline assembly of FIG. 1 is a multi-sectional propeller shaft driveline assembly including two propeller shaft portions 9, 10, at least one of which is a propeller shaft having improved structural rigidity in accordance with the present invention. The present invention may also be used to advantage front-wheel drive, all-wheel drive, rear-wheel drive or other four-wheel drive driveline configurations. The improved propeller shaft of the present invention can also be used to advantage driveline assemblies having a singular propeller shaft (omitting the second joint 13), or propeller shaft assemblies having more than two propeller shaft portions. Indeed, due to the improved rigidity, the second joint 13 may not be necessary to provide the desired noise, vibration and harshness (NVH) characteristics of the driveline.

Figure 2:
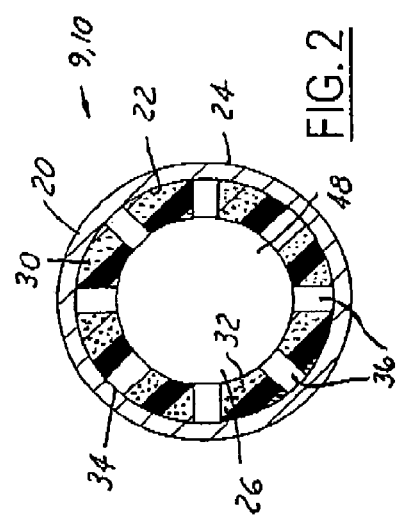
FIG. 2 is a cross-sectional view of a propeller shaft in accordance with one embodiment of the present invention.

Referring now to FIG. 2, there is shown a cross-sectional view of a propeller shaft in accordance with one embodiment of the present invention. FIG. 2 shows the tubular middle portion of the propeller shaft assembly in accordance with the present invention which may form the middle portion of propeller shaft 9 or 10 of FIG. 1, for example. A shaft 9, 10 includes a thin-walled hollow tube 20 having an interior surface 22 and an exterior surface 24. The interior surface 22 of the tube 20 defines an interior space 26. The tubular portion 20 of the shaft 9, 10 is typically made of metal, however, such hollow shafts have also been made of carbon fiber, fiber reinforced plastic or other carbon or chemical composites. The tubular portion 20 can be a single layer such as in the case of metal tubes or multi-layer such as in the case of fiber reinforced plastic or sheet-wrapped carbon configurations.

In the interior 26 of the tube 20, there is inserted a support member 30 which acts to increase the lateral stiffness of the tube, i.e., improve the rigidity of the tube 20 to thereby increase the bending frequency of the completed shaft assembly. The support structure 30 allows the shaft 9, 10 to be designed longer for a given diameter tube 20. The support member 30 comprises a lightweight, rigid structure. In the example of FIG. 2, the support structure is a cement or epoxy resin-impregnated open cell foam insert. Open cell foam is advantageous in that it is easy to work with, can be light, and can be made to readily accept cement or epoxy resin. It acts as a pliable carrier for the resin or cement which, when combined with the foam provides a high modulus lightweight structure for improving the rigidity of the tube. The open cell foam is in the form of a hollow tube having an inner surface 32 defined by an inside diameter and an outer surface 34 defined by an outside diameter. The outer diameter of the open cell foam tube should be selected to be greater than or equal to the inner diameter of the tube 20 when the foam is at rest. This ensures a sufficient interference fit between the outer surface 34 of the foam 30 and inner surface 22 of the tube 20 to permit the support member 30 to increase the structural rigidity of the overall assembly. The open cell foam can also be a solid cylinder, although the added weight of the support structure may outweigh the benefit of any additional rigidity such a structure could provide. To reduce the weight of the structure, radial openings 36 can be formed in the foam tube or cylinder. The openings can be circumferentially and axially spaced along the length of the foam. To maintain the balance of the foam insert, each group 38 of openings 36 should be equally circumferentially spaced. For example, if four openings 36 are desired, they should be circumferentially spaced approximately 90° apart from each other. If three openings 36 are desired, they should be spaced 120° apart from one another, and so on.

Several types of open-cell foam are available, and many act as a sufficient carrier of the resin or cement to provide the desired support. In the present application, the term "foam" is intended to include all foams which are polymer-based materials and include a gas phase dispersed in a solid plastic phase. Such structures are typically referred to as plastic foam, foamed plastic and cellular plastic. These terms are used interchangeably, and refer to foamed plastics regardless of cell structure. The present invention uses an open-cell foam. Foams are typically classified as open-cell or closed-cell. In open-cell foams, the individual cells are interconnected and form a matrix. The term "sponge" is sometimes used to refer to open-cell foams. Generally, no foam has entirely one type of cell structure. Thus, the term open-cell refers to the predominate cell pattern of the foam. The open-cell plastic foam should also be flexible to permit the structure to be worked into the opening of the tube 20. Open-cell plastic foam is preferred for the present support structure because it offers little resistance to the passage of liquids and gases. Accordingly, it acts a good carrier structure for the cement or resin.

A high modulus epoxy resin or cement is carried by the flexible open-cell plastic foam.

Figure 3:
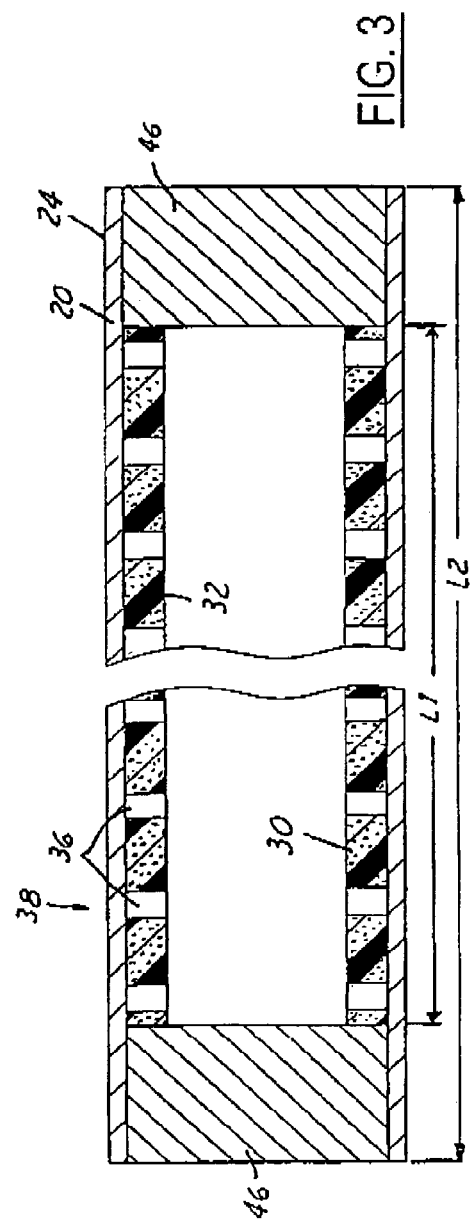
FIG. 3 is a longitudinal sectional view of the propeller shaft of FIG. 2.

Referring now to FIG. 3, there is shown a longitudinal sectional view of the propeller shaft of FIG. 2. As can be seen in FIG. 3, the length (L1) of the support member 30 can vary with respect to the length (L2) of the tube 20. Also, for simplicity, end connecting members such as a stub shaft or inner or outer joint part have been omitted from FIG. 3. Such end connection members are represented generically by plugs 46 although such plugs 46 may also be employed in addition to a shaft connecting member.

With regard to the construction of the shaft 9, 10, the dimensions of the shaft will be determined by the natural bending frequency desired for the particular power transmission application. The dimensions of the propeller shaft tube usually varies between 40 mm and 2500 mm in length (L2). Sufficiently short tubular shafts provide sufficiently high rigidity such that no support member 30 is required. With regard to the axial length (L1) of the support member 30, the ratio L1/L2 should not be less than 0.25 and not greater than 1.0. If the support member 30 does not span a sufficient length of the tube 20, the structural rigidity of the shaft assembly is only marginally improved, if at all. Similarly, the structural rigidity of the shaft assembly is not improved any further when the length of the support member 30 exceeds the length of the tube 20. Thus, it is unlikely that a tube assembly having a ratio L1/L2 greater than 1.0 would be necessary.

The thickness of the tube 20 ranges between 1 mm and 4 mm in the case of metal tubes and between 1 mm and 8 mm in the case of composite or carbon fiber tubes. In addition, the outer diameter of the tube 20 should vary between approximately 40 mm and 300 mm. Very small diameter metal tubes, when used in a vehicle driveline, cannot satisfactorily transmit torque even if a support member is used within the tube or the shaft. Also, very large diameter propeller shafts present packaging problems as they are likely to interfere with other vehicle components along the underside of the vehicle body.

The resulting propeller shaft assembly can be produced in several ways. According to one method, tubular pieces of flexible open-cell plastic foam are provided. The outsider diameter of the foam is greater than or equal to the inside diameter of the tube 20. High modulus resin or cement is applied to the foam piece such that the resin or cement impregnates the open-cell foam structure. The saturated foam is then inserted into the tube 20. As the resin sets up, the foam becomes rigid, thereby increasing the stiffness properties of the tube.

In another embodiment, high modulus, non-flexible foamed plastic is inserted into the tube 20. The foamed plastic may be closed-cell or open-cell. The foam insert support member 30 can be introduced into the tube 20 either before or after it has set up. Again, it is desirable to ensure a close fit between the foam insert and the inner surface 22 of the tube 20. This can be accomplished by forming the rigid foam insert to have an outer diameter slightly greater than or equal to the inner diameter of the tube 20. If the foam insert is greater in diameter than the tube 20, some deformation of the foam insert and/or tube 20 may occur during the introduction of the support member 30 into the tube 20.

According to another method, a high modulus, non-flexible foamed plastic may be foamed directly into the interior of the tube 20. The support member 30, thus, results when the foamed plastic or cement in the interior of the tube 20 sets. Such a method is advantageous in that it takes the form of the interior of the tube 20 and ensures a close fit. A mandrel (not shown) may be placed inside the tube 20 during the foaming process, and removed after the foaming process, to create a void 48 in the center of the support member 30 to save weight.

From the foregoing, it can be seen that there has been brought to the art a new and improved propeller shaft which has advantages over prior propeller shaft assemblies. While the invention has been described in connection with one or more embodiments, it should be understood that the invention is not limited to those embodiments. On the contrary, the invention covers all alternatives, modifications, and equivalents as may be included within the spirit and scope of the appended claims.

What is claimed is:

1. A propeller shaft assembly comprising:
    a tubular member having an outer surface defined by an invariable outside diameter and an inner surface defined by an invariable inside diameter; and
    a tubular support member constructed of an open-cell foam disposed within said tubular member and having an inner surface defined by an invariable inside diameter, said inner surface forming a cylindrical, empty cavity within said tubular member, and an outer surface defined by an invariable outside diameter, said outer surface engaging said inner surface of said tubular member for the propeller shaft assembly;
    wherein said open-cell foam is impregnated with one of a resin and a cement.

2. An assembly according to claim 1 wherein said tubular support member includes a plurality of openings formed along a length (L1) of said tubular support member for reducing the weight of said tubular support member.

3. An assembly according to claim 1 wherein said open-cell foam is generally flexible before being impregnated with one of said resin and said cement.

4. An assembly according to claim 1 wherein said tubular member comprises one of a metal and a reinforced plastic.

5. An assembly according to claim 1 wherein said tubular member has a length (L2) greater than a length (L1) of said tubular support member.

6. an assembly according to claim 5 wherein said ratio L1/L2 is not less than 0.25 and not greater than 1.0.

7. An assembly according to claim 1 wherein said tubular member has a thickness generally less than 8 mm.

8. An assembly according to claim 1 wherein said outer diameter of said tubular member is generally greater than 40 mm and is generally less than 300 mm.

9. An assembly according to claim 1 further comprising a connecting member fixed to each end of said tubular member.

10. An assembly according to claim 1 wherein said outside diameter of said tubular support member is greater than or equal to said inside diameter of said tubular member such that said tubular support member engages said tubular member via interference fit.

11. A torque transmission shaft comprising:
   a metal tube having an outer surface defined by an invariable outside diameter and an inner surface defined by an invariable inside diameter; and
   a tubular support member co-axially located within said metal tube and having an inner surface defined by an invariable inside diameter, said inner surface forming a cylindrical, empty cavity within said metal tube, and an outer surface defined by an invariable outside diameter, said outer surface engaging said inner surface of said metal tube, said support member comprising a rigid foamed plastic extending along a length of said metal tube.

12. A torque transmission shaft according to claim 11 wherein said support member has a first length (L1) and said metal tube has a second length (L2) and the ratio L1/L2 is less than 1.0.

13. A torque transmission shaft according to claim 11 wherein said support member includes a plurality of openings formed along a first length (L1) for reducing the weight of said support member.

14. A torque transmission shaft according to claim 11 wherein said support member comprises an open cell foamed plastic impregnated with one of a resin and a cement.

15. A torque transmission shaft according to claim 14 wherein said open-cell foamed plastic is generally flexible before being impregnated with one of said resin and said cement.

16. A torque transmission shaft according to claim 11 wherein said support member has a first length (L1) and said metal tube has a second length (L2) and the ratio L1/L2 is greater than 0.25.

17. A torque transmission shaft according to claim 11 further comprising a joint element or stub shaft fixed to each end of said metal tube.

18. A torque transmission shaft according to claim 11 wherein said outside diameter of said support member is greater than or equal to said inside diameter of said metal tube such that said support member engages said metal tube via interference fit.

19. A method of producing a rigid torque transmission shaft comprising:
   providing a tube having an outside surface defined by an invariable outside diameter and an inner surface defined by an invariable inside diameter; and
   introducing a tubular support member co-axially within said tube, said support member having an inner surface defined by an invariable inside diameter, said inner surface forming a cylindrical, empty cavity within said tube, and an outer surface defined by an invariable outside diameter to engage said inner surface of said tube, said support member comprising a rigid foamed plastic extending along a length of said tube;
   wherein said tube is one of a metal and a reinforced plastic.

20. A method of producing a torque transmission shaft according to claim 19 wherein the outside diameter of the tubular support member is greater than or equal to the inside diameter of the tubular member such that the tubular support member is introduced via interference fit.

* * * * *